United States Patent [19]

Ingram

[11] 4,410,205

[45] Oct. 18, 1983

[54] BLOW OUT PREVENTER HOSE COUPLING

[75] Inventor: Thomas L. Ingram, Sherman, Tex.

[73] Assignee: Airsco Hydraulics, Inc., Dallas, Tex.

[21] Appl. No.: 217,421

[22] Filed: Dec. 17, 1980

[51] Int. Cl.³ .................. F16L 55/00; F16L 39/00; F16L 51/02; F16L 33/00

[52] U.S. Cl. .................................. 285/47; 285/149; 285/175; 285/226; 285/256; 251/1 R

[58] Field of Search ............... 285/149, 47, 175, 226, 285/256; 251/1 R; 166/DIG. 1

[56] References Cited

U.S. PATENT DOCUMENTS 2,666,657  1/1954  Howard et al. .............. 285/226 X
2,809,668  10/1957 Sipovic ........................... 285/149
2,987,329  6/1961  Barton ............................ 285/149
3,165,338  1/1965  Moss .............................. 285/256
3,529,853  9/1970  Triest et al. .................. 285/256 X

FOREIGN PATENT DOCUMENTS 2740666  3/1979  Fed. Rep. of Germany ...... 285/226

Primary Examiner—Richard J. Scanlan, Jr.
Attorney, Agent, or Firm—G. Roland Love

[57] ABSTRACT

An oil well blow out preventer hose coupling capable of withstanding blow out conditions. The coupling is characterized by a tubing having a ring connected to one end to which a nipple is attached to receive a corresponding coupling. The second end of the tubing has a stem attached for receiving the blow out preventer hose which is fastened to the stem. This entire structure is then wrapped with insulation and provided with an outside armored covering extending from the ring back over the tubing, stem and blow out preventer hose.

18 Claims, 4 Drawing Figures

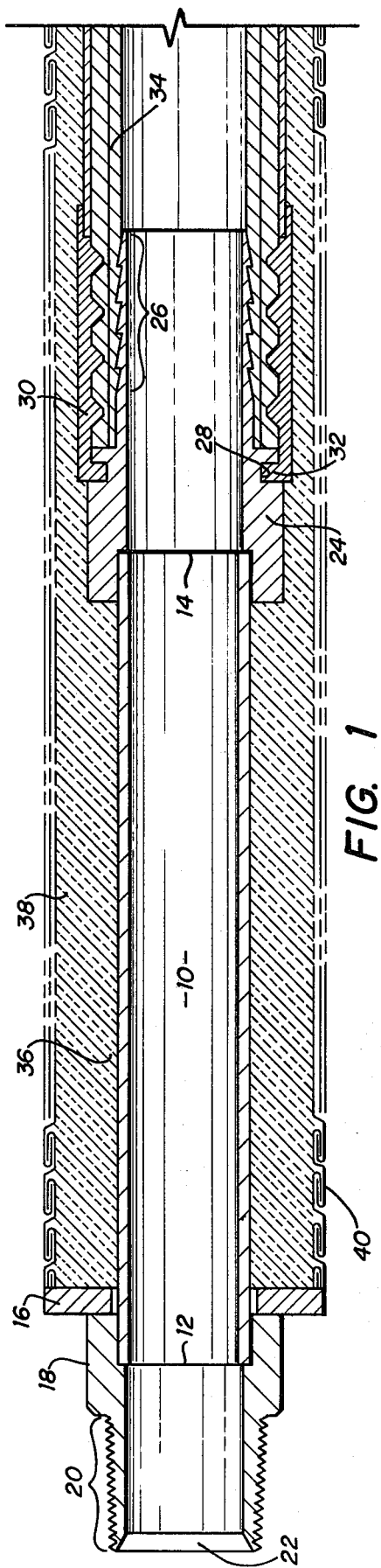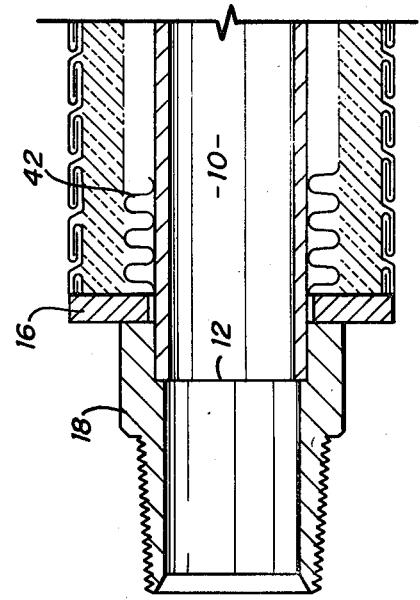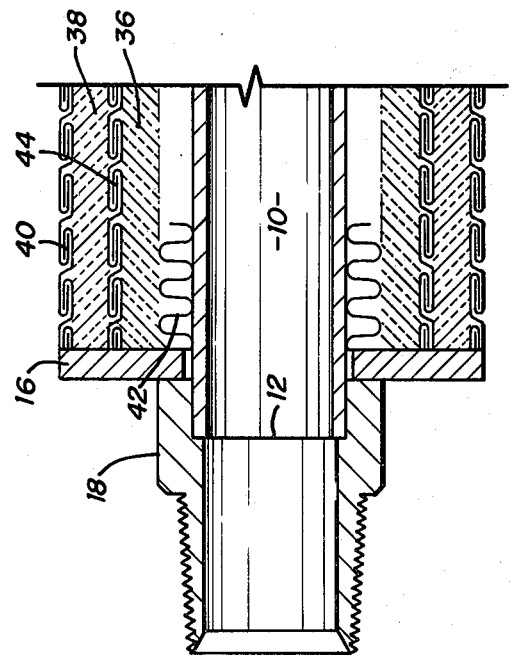
FIG. 1
FIG. 2
FIG. 3

BLOW OUT PREVENTER HOSE COUPLING

BACKGROUND OF THE INVENTION

1. Field of the Invention

This invention is related to hose couplings and more particularly, but not by way of limitation, to hose couplings for a blow out preventer to be used under oil well blow out conditions.

2. Description of the Prior Art

Particularly in an oil well, adverse conditions are experienced during blow out conditions. The mechanisms present in the oil well which operate to shut down the oil well in the event of a blow out are often actuated by hydraulic means. The hoses conveying the hydraulic fluid must be capable of withstanding adverse conditions, particularly fire. It is therefore desirable to provide a quick coupling which is capable of withstanding significant heat, especially for an initial period of time. There are other hoses available on the market such as those manufactured by Stratoflex and Goodall which are intended to convey hydraulic fluid during blow out conditions. This invention presents a hose coupling particularly capable of withstanding blow out conditions.

SUMMARY OF THE INVENTION

The present invention may be briefly described as a coupling for a blow out preventor hose or other hose expected to experience adverse conditions. The hose coupling is structured such that it can withstand significant heat. A tubing is attached to a nipple for coupling with a stem attached to the free end for receiving the blow out preventor hose. A ring is placed around the tubing at the nipple so that an outside protective hose can be attached to the outside perimeter of the ring and surround the entire coupling except for the nipple. Insulation is placed within the covering and surrounding the tubing, stem and blowout preventer hose. In an alternative embodiment, a convoluted tubing is placed outside the tubing but within the insulation to provide improved heat transfer characteristics. Also a second alternative provides further improved heat transfer characteristics by adding an interlocked hose between the layers of insulation extending from the ring over the tubing and stem.

BRIEF DESCRIPTION OF THE DRAWINGS

FIG. 1 is a sectional view of one embodiment of the invention;

FIG. 2 shows an alternative embodiment of the invention;

FIG. 3 is a second alternative embodiment of the invention; and

DESCRIPTION OF THE PREFERRED EMBODIMENT

Figure 4:
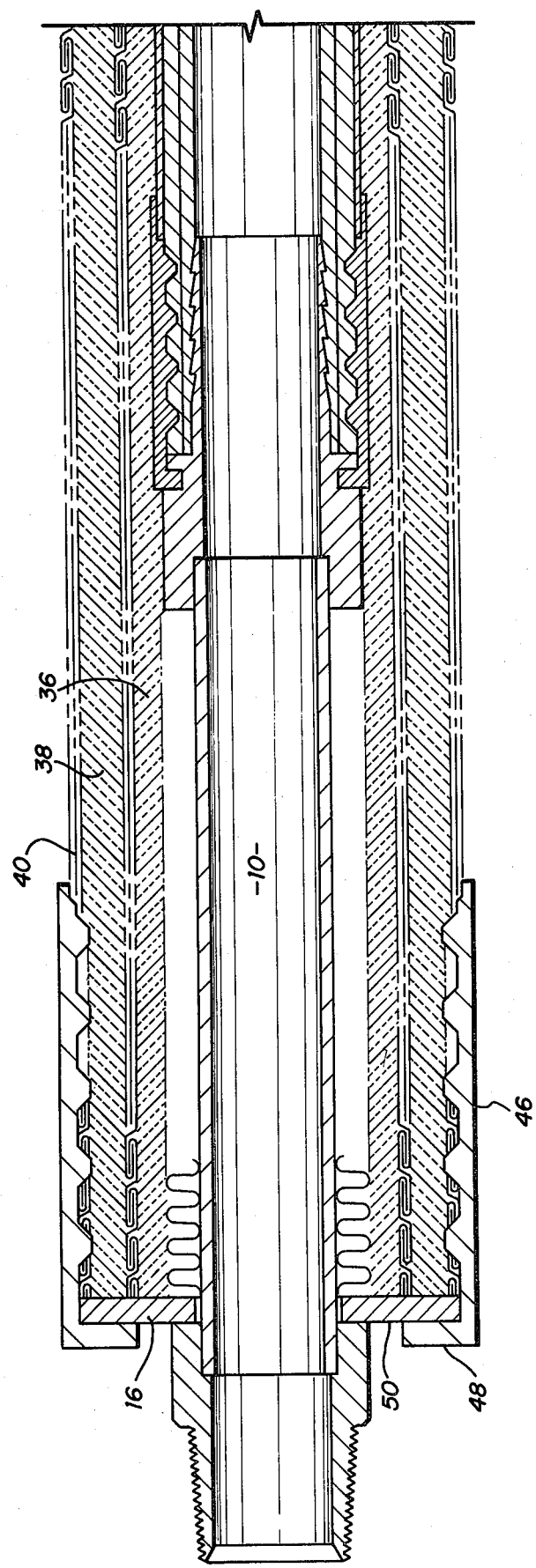
FIG. 4 is a third alternative embodiment of the invention.

With reference to FIG. 1, a preferred embodiment of the invention includes a hollow cylindrical tubing 10 which has a first end 12 and a second end 14. In the preferred embodiment the tubing is type 304 stainless steel tubing having a wall diameter of 0.096 inches and having a length of 6-1/16 inches.

A toroid or ring 16 is attached to the tubing 10 in the proximity of the first end 12. In the preferred embodiment the ring is a type 304 stainless steel 12 gauge ring. It has an inside diameter of 1-⅛ inches and an outside diameter of 2-⅛ inches. The ring is welded to the outside of the tubing 10 at a distance of approximately ½ inch from the first end 12 of the tubing 10.

A nipple 18 surrounds the tubing 10 at the first end 12 of the tubing and is attached to the ring 16. The nipple 18 is preferably type 304 stainless steel NPTF solid male. The male threaded portion 20 tapers towards the initial end 22 of the nipple 18 such that the initial diameter is slightly more narrow than the terminating outside diameter of the threaded portion 20. Further, the initial opening 22 of the nipple slants inward from the outside perimeter of the threaded portion to the inside perimeter of the threaded portion at an angle of 30° from the horizontal axis of the nipple 18. The horizontal axis is the central axis of the nipple 18. In the preferred embodiment, the inside diameter of the nipple 18 is 0.844 inches.

A stem 24 is attached to the second end 14 of the tubing 10. The stem 24 surrounds the second end 14. The stem is provided with a serrated outside perimeter portion 26 which provides a holding surface. The serrated arrangement forms a series of rings which grip and seal the junction with the overlying hose. Further, a notch 28 is provided in the stem in the preferred embodiment to receive an extension 32 of the steel ferrule 30. In the preferred embodiment the stem 24 also has an inside diameter of 0.844 inches.

The steel ferrule 30 crimps onto the blow out preventer hose 34. In the preferred embodiment the blow out preventer hose is a spiral wire hose. The hose 34 is skived back 1.5626 inches in the preferred embodiment. The skived portion is them placed between the ferrule 30 and the serrated portion 26 of the stem 24 to provide more secure fastening. The ferrule 30 is crimped onto the skived portion and against the serrated portion 26.

This entire arrangement consisting of the tubing, stem, hose and ferrule is then wrapped with two layers of insulation, 36 and 38 respectively. In the FIG. 1 drawing, the layer of insulation is shown as one integral portion. In the alternative embodiments to be discussed, the two layers of insulation will be separated to some extent. Note that the insulation extends from the ring 16 back towards the second end 14 of the tubing 10 over the tubing 10 and over the stem, hose and ferrule.

Finally, an armored covering 40 is provided. In the preferred embodiment, the armored covering is a flexible stainless steel interlocked hose which is welded to the stainless steel ring 16. The interlocked hose then extends back from the outside perimeter of the stainless steel ring toward the second end 14 of the tubing 10. The interlocked hose covers the insulation.

This preferred embodiment provides a blow out preventer hose coupling which is capable of withstanding adverse conditions in the event of a blow out fire. The preferred embodiment has been tested to withstand 2000° F. for thirty minutes. This is not a maximum range but sufficient to handle known conditions during a blow out fire.

An alternative embodiment is shown in FIG. 2. This variation provides improved heat transfer characteristics due to the use of a convoluted tubing 42. The convoluted tubing surrounds the tubing 10. It is attached at one end to the ring 16 and extends over the tubing 10 towards the second end 14 of the tubing and ending at the stem.

A second alternative embodiment of the invention is shown in FIG. 3. Again the convoluted tubing 42 has been included to provide improved heat transfer characteristics. However, the insulation layers 36 and 38 are separated by a second stainless steel interlocked hose 44 for an initial region. The interlocked hose 44 is attached to the ring 16 and extends approximately 6 inches past the steel ferrule 30. This provides further armoring about the coupling.

A third alternative embodiment of the invention is shown in FIG. 4. This variation develops upon the embodiment shown in FIG. 3. A stainless steel ferrule crimp 46, sized to fit over the ring 16, is added to more securely fasten the armored covering 40 to the ring 16 and over the insulation layers 36 and 38. The crimp 46 has a lip 48 which meets the planar surface 50 of the ring 16. In this manner, the armored covering 40 is prevented from sliding away from the ring 16 and pressure is exerted on the insulation layers 36 and 38 to form a tight wrapping.

While rather specific terms have been used to describe the present invention, they are not intended nor should they be construed as a limitation upon the invention as defined by the following claims.

What is claimed is:

1. A hose coupling comprising:
   a hollow cylindrical tubing with first and second ends;
   a toroid attached around the outside circumference of the tubing at a location near the first end of the tubing;
   attachment means attached to and extending from the toroid over and beyond the first end of the tubing along its longitudinal axis for coupling to a corresponding coupling;
   a stem attached at the second end of the tubing and extending away from the tubing along its longitudinal axis for connecting a hose at the second end of the tubing;
   insulation surrounding the hollow cylindrical tubing from the toroid back away from the first end of the hollow cylindrical tubing towards and over the second end of the tubing and the stem attached thereto.

2. The hose coupling of claim 1 further comprising a flexible armored covering surrounding the insulation and attached to the toroid planar surface at the outside perimeter of the toroid.

3. The hose coupling of claim 2 further comprising a stainless steel ferrule crimp sized to fit over the toroid and flexible armored covering and lipped to fit against the planar surface of the toroid toward the first end of the hollow cylindrical tubing.

4. A hose coupling comprising:
   a hollow cylindrical tubing with first and second ends;
   a toroid attached around the outside circumference of the hollow cylindrical tubing at a location near the first end of the hollow cylindrical tubing;
   attachment means attached to and extending from the toroid over and beyond the first end of the hollow cylindrical tubing along its longitudinal axis for attaching to a corresponding coupling;
   a stem attached at the second end of the hollow cylindrical tubing and extending away from the hollow cylindrical tubing along its longitudinal axis for connecting a hose at the second end of the hollow cylindrical tubing;
   convoluted tubing surrounding the hollow cylindrical tubing and located between the toroid and the stem attached to the second end of the hollow cylindrical tubing;
   insulation surrounding the convoluted tubing from the toroid back away from the first end of the hollow cylindrical tubing towards and over the second end of the tubing and the stem attached thereto; and
   flexible armored covering surrounding the insulation and attached to the toroid planar surface at the outside perimeter of the toroid.

5. A hose coupling comprising:
   a hollow cylindrical tubing with first and second ends;
   a toroid attached around the outside circumference of the tubing at a location near the first end of the tubing;
   attachment means attached to and extending from the toroid over and beyond the first end of the tubing along its longitudinal axis for attaching to a corresponding coupling;
   a stem attached at the second end of the tubing and extending away from the tubing for connecting a hose at the second end;
   a first layer of insulation surrounding the hollow cylindrical tubing from the toroid back away from the first end of the hollow cylindrical tubing towards and over the second end of the tubing and the stem attached thereto;
   an interlocked hose surrounding the first layer of insulation and extending from the toroid and past the stem attached to the second end of the hollow cylindrical tubing;
   a second layer of insulation surrounding the interlocked hose and extending from the toroid planar surface away from the first end of the hollow cylindrical tubing towards and over the second end of the hollow cylindrical tubing and slightly beyond the stem attached to the second end of the hollow cylindrical tubing; and
   a flexible armored covering surrounding the first layer of insulation, interlocked hose, and second layer of insulation and attached to the toroid planar surface at the outside perimeter of the toroid.

6. The hose coupling of claim 5 further comprising a second crimping means which fits over the toroid and flexible armored covering in the direction of the stem, having a lip to meet the planar surface of the toroid facing the attachment means.

7. An oil well blow out preventer hose coupling comprising:
   hollow tubing having first and second ends;
   a ring attached around the outside of the tubing near the first end of the tubing;
   a male nipple attached to the ring and surrounding the first end of the tubing for mating with a corresponding female coupling;
   a stem attached to and surrounding the second end of the tubing for receiving the blow out preventer hose;
   fastening means for connecting the blow out preventer hose to the stem;
   flexible hose covering attached to the outside perimeter of the ring and extending over the tubing in the direction of the second end, the stem, blow out preventer hose and fastening means; and, insulation material located between the flexible hose covering and the tubing, stem, blow out preventer hose and fastening means for insulating the blow out preventer hose and hose coupling.

8. The oil well blow out preventer hose coupling of claim 7 wherein the tubing, ring, and nipple are stainless steel.

9. The oil well blow out preventer hose coupling of claim 7 wherein the male threaded portion of the nipple tapers to an initial diameter more narrow than the outside diameter of the termination of the threaded portion of the nipple.

10. The oil well blow out preventer hose coupling of claim 7 wherein the flexible hose covering is stainless steel interlocked hose.

11. The oil well blow out preventer hose coupling of claim 7 wherein the outside perimeter of one end of the stem is serrated to provide a gripping surface.

12. The oil well blow out preventer hose coupling of claim 9 wherein the fastening means comprises a steel ferrule for crimping the blow out preventer hose onto the stem.

13. The male nipple of claim 9 wherein the initial narrow end of the male threaded portion slants inward from its outside perimeter to inside perimeter at an angle of 30° from the horizontal axis formed by the central axis of the nipple.

14. The stem of claim 13 further comprising a notched portion for receiving and holding an extension of the fastening means to more securely fasten the blow out preventer hose.

15. An oil well blow out preventer hose coupling comprising:
  hollow tubing having first and second ends;
  a washer attached around the outside of the hollow tubing near the first end of the hollow tubing;
  a male nipple attached to the washer and extending over the first end of the hollow tubing for mating with a corresponding female coupling;
  a stem attached to and extending from the second end of the hollow tubing for receiving the blow out preventer hose;
  fastening means for connecting the blow out preventer hose to the stem;
  convoluted tubing surrounding the hollow tubing and extending between the washer and the second end of the hollow tubing, stem, blow out preventer hose and fastening means;
  insulation surrounding the convoluted tubing and extending from the washer toward the second end of the hollow tubing to cover the tubing, stem, and fastening means; and
  a flexible hose covering attached to the outside perimeter of the washer and surrounding and extruding over the insulation in the direction of the second end of the hollow tubing, the stem, and fastening means.

16. The oil well blow out preventer hose coupling of claim 15 further comprising a stainless steel ferrule having a lip which meets the surface of the washer facing the nipple, and which fits over the outside perimeter of the washer and flexible hose covering to crimp onto the flexible hose covering.

17. An oil well blow out preventer hose coupling comprising:
  hollow tubing having first and second ends;
  a washer attached around the outside of the hollow tubing near the first end of the hollow tubing;
  a male nipple attached to the washer and extending over the first end of the hollow tubing for mating with a corresponding female coupling;
  a stem attached to and extending from the second end of the hollow tubing for receiving the blow out preventer hose;
  fastening means for connecting the blow out preventer hose to the stem;
  convoluted tubing surrounding the hollow tubing, and extending from the washer toward the second end of the tubing, stem, blow out preventer hose and fastening means;
  a first layer of insulation surrounding the convoluted tubing and extending from the washer toward the second end of the tubing and extending over the second end of the tubing, stem and fastening means;
  a stainless steel interlocked hose attached to the washer and covering and extending over the first layer of insulation towards the second end of the tubing to approximately the stem area;
  a second layer of insulation surrounding the stainless steel interlocked hose and extending from the washer toward the second end of the tubing and over the second end of the tubing, stem and fastening means; and
  a flexible hose covering attached to the outside perimeter of the washer and surrounding and extending over the insulation in the direction of the second end of the tubing, the stem, blow out preventer hose and fastening means.

18. The oil well blow out preventer hose coupling of claim 15 further comprising a stainless steel ferrule, having a lip which meets the surface of the washer facing the nipple, and which fits over the washer and flexible hose covering to crimp onto the flexible hose covering.

* * * * *